July 23, 1940.  J. P. MINTON  2,209,100
ELECTRIC SEISMOGRAPH
Filed Feb. 19, 1938  4 Sheets-Sheet 1

Inventor
John P. Minton
By Dallas R. Lamont
Attorney

Inventor
John P. Minton
By Dallas R. Lamont
Attorney

July 23, 1940.    J. P. MINTON    2,209,100
ELECTRIC SEISMOGRAPH
Filed Feb. 19, 1938    4 Sheets-Sheet 4

Inventor
John P. Minton
By Dallas R. Lamont
Attorney

Patented July 23, 1940

2,209,100

UNITED STATES PATENT OFFICE 2,209,100

ELECTRIC SEISMOGRAPH

John P. Minton, Dallas, Tex., assignor, by mesne assignments, to Socony-Vacuum Oil Company, Incorporated, New York, N. Y., a corporation of New York Application February 19, 1938, Serial No. 191,404

1 Claim. (Cl. 181—0.5)

This invention relates generally to the art of seismic surveying and more particularly to a method and apparatus that is to be employed in recording seismic waves.

In seismic surveying it is customary to detonate a charge of dynamite below the surface of the ground in order to generate a group of seismic waves. These waves travel out in all directions and actuate the group of detectors or geophones distributed in a predetermined manner from the point of detonation of the dynamite. One is interested, mainly, in discontinuities in the subsurface strata, known in the art as structures, at substantial distances below the earth's surface, for such structures are often associated with the accumulation of oil deposits. It is desirable to locate the depths of these structures accurately to within a few feet of their actual depths. In this manner surveys can be made of large areas that are of interest from the viewpoint of finding structures favorable to the location of oil. In order to determine accurately the distances to subsurface structures it is necessary to determine two factors which enter into seismograph surveying. The first factor is to determine accurately the time interval which elapses from the time of the detonation of the dynamite and the return of the vibration energy returning from the subsurface beds. The other factor is the determination of the velocity with which the seismic waves travel down to and back from the reflecting beds.

The seismograph surveying method, therefore, consists, fundamentally, of a precise timing system and a velocity determination method. Means are known whereby it is possible to determine to within $\frac{1}{1000}$ of a second the exact distance of detonation of the dynamite. It, therefore, becomes of very much importance for precision work to be able to determine precisely when the reflected waves return from the various subsurface beds to actuate the seismic detectors buried within the earth's surface. This problem is a difficult one and requires special equipment in order to solve it accurately. It is common knowledge to those experienced in seismograph surveying that the detonation of dynamite within the earth's surface generates a complex group of waves. Those who are skilled in this art know that these waves are generally referred to as compressional waves, transverse waves, Rayleigh waves, Love waves and perhaps others. These groups of waves are of different types, all of which travel through the earth at different velocities. They also, are not single frequency waves, but consist, for the most part, of bands of frequencies. It is a well known fact to those skilled in the art that the velocities of the various frequencies in any particular band differ. For example, the transverse chain of waves may travel at 5,000 feet per second, but the different frequencies within this band may travel between 4,000 feet and 6,000 feet per second. Likewise, the compressional type of wave may travel at 10,000 feet per second, but the various frequencies within this band may have velocities varying from 9,000 feet to 11,000 feet per second, for example. This means that, as in the case of the compressional band of waves, the wave envelope will change more and more the farther the waves traverse the earth's surface.

It is also common knowledge to those skilled in the art that the higher frequencies, say of a compressional wave, travel faster than do the low frequencies of this band. Consequently, when a photographic record of these waves is recorded on a moving film, the high frequencies are recorded first, followed by the recording of the lower frequencies. Also the energy distribution over this band of compressional waves varies with a small amount of energy at the low and high frequency ends of the band and with the maximum energy in the middle region of the band.

Those skilled in the art of seismic surveying are able to detect the return of reflected energy from the various sub-surface beds by the change observed in the character of the record on the photographic paper. Inasmuch as the seismic surveying method is a precise method of measuring time intervals between the generation and return of the wave trains, accuracy becomes a question of how well one can pick the return of the energy on the records. It has been the practice in the past not to attempt to pick the first indication of the return energy, but to pick some particular point on the record, such, for example, as the first leg of the return energy. It is not possible, however, to pick specifically a first leg or trough of the reflected energy, for the reason that it may be of extremely small amplitude and relatively high frequency. Also, as explained above, there are other types of waves being recorded simultaneously with the wave band reflected from the subsurface beds, so that if no means were taken to exclude these other types of waves from the record, very great error could readily be introduced in "picking" the time of return of the reflected energy.

In a seismograph method then it becomes essential to exclude from the record the undesirable types of waves, as well as to emphasize the higher frequencies of the reflected waves, in order to pick more accurately the return of reflected waves from the subsurface beds. Focusing our attention on only the reflected compressional waves, giving us information on the return of the reflected waves, it becomes necessary to record as accurately as possible a true picture of these waves. It is well known to those skilled in the art of telephone communication work that an electrical network will record accurately a picture of the incoming signals only under one condition, namely, that there are no phase and frequency distortions.

In this case one is not particularly interested in the question of frequency distortion, but is concerned with the question of phase distortion. In electrical network if the phase is plotted against the frequency, the result should be a straight line passing through zero. That is, the phase is a linear function of the frequency. For this condition all the frequencies pass through the electrical network at identical speeds, or, in other words, the wave envelope passes through the electrical network without any distortion of its shape disregarding amplitude distortion with frequency. The picture recorded at the output of such a network will be identical, so far as the envelope is concerned, with that of the input. A record produced by such an electrical network of the signals reflected from the subsurface beds will be identical with the signals that actuate the geophones or detectors. This is true no matter how complex the electrical network is, provided only that the phase is a linear function of the frequency. Such a system composed, for example, of the detector, a seismograph amplifier and electrical network and a galvanometer will be an ideal seismograph recording system, if it possesses the phase characteristic as specified herein.

The selective attenuator is desirable for seismograph surveying because the frequency band of the reflected energy is different in different locations. In certain sections of the United States, for example near the Gulf of Mexico coast, the reflected energy appears to cover a band of frequencies the middle portion of which, as well as the maximum energy of which, are in the region of 35 cycles. In Mid-Continent areas this band of frequencies is shifted to a higher middle register, say, for example, 50 cycles, and, in some cases, substantially higher than 50 cycles.

It must be clearly understood, of course, that the band of frequencies, no matter about what frequency it centers, is of the nature of a continuous frequency band and not of discreet frequency bands. A selective attenuator system must, therefore, possess the features which make it possible to adjust its response to the particular band of frequencies being recorded. Its response must be maximum in the region of 35 cycles for Gulf Coast work, and for Mid-Continent work its maximum response must be adjustable to 50 or more cycles. If this is not attained, then the seismic recording system is not attuned to the incoming signals and full advantage of the incoming energy is not taken by the recording system.

It was customary in seismic recording heretofore to have a poorly designed common filter arrangement of fixed electrical constants. Such a system would not serve well for certain sections of the country, nor would it be universally adaptable or flexible enough to permit accurate seismic surveying work in all parts of the country, over which seismic surveying conditions vary greatly. Also, these customary types of filters possess substantial phase error and the speeds with which the frequencies of a reflected band pass through the seismic amplifier vary greatly. This error is increased with an increase in the number of such sections added to the seismograph amplifier and filters.

Therefore, it is an object of this invention to provide a method and means to exclude from the seismogram the undesirable types of waves and to emphasize the higher frequencies of the reflected waves.

Another object of this invention is to provide means whereby corrections may be made for relative phase distortion.

A still further object of this invention resides in the provision of means for attenuating wave signals that have been generated in sympathy with seismic waves.

Another object of this invention is to accentuate the higher frequency portion of the reflected energy relative to low frequency portion of reflected energy in order that the total time occupied by single reflections will be reduced.

Still another object of this invention is in the provision of means that are sufficiently flexible that it may be adjusted to accommodate modified character of waves from point to point.

This invention further contemplates an electrical network that may be adjusted to respond to the particular band of frequencies being recorded by the manipulation of a single control.

Still another object of this invention resides in the provision of means whereby the point of frequency of the infinite attenuation can be adjusted to suit the surrounding conditions.

Still another object of this invention is the provision of means whereby the point of frequency cut-off can be controlled subject to the requirements of the existing conditions encountered in the particular area.

Still another object of this invention is in the provision of means for controlling the amplification in a manner that it will decrease above the point of frequency cut-off with higher frequencies to eliminate the possibility of recording the microseismic waves of the higher frequencies such as those produced by objects being vibrated or moved by wind.

Still another object of this invention is in the provision of means for maintaining the phase angle constant over the main frequency band of the reflected energy.

Other objects and advantages will appear from the following detailed description when considered in connection with the drawings in which.

Figure 1:
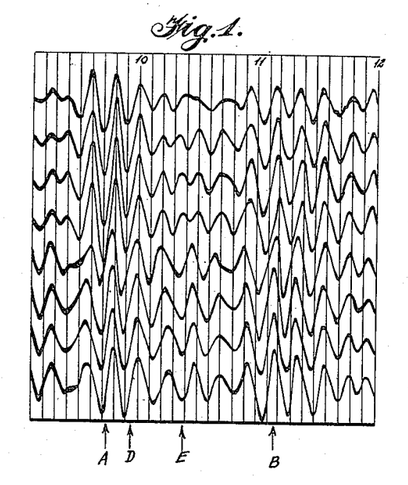
Figure 1 is an illustration of a portion of a seismogram showing a group of reflections which have been recorded by the use of a filter adjusted to lend emphasis to the lower frequencies of the reflected energy.
Figure 5:
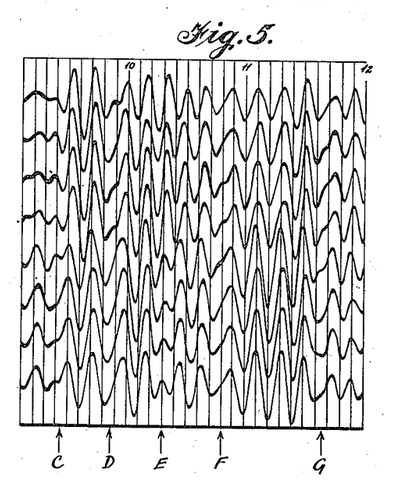
Figure 5 is an illustration of the same group of reflected waves shown in Figure 1 that have been recorded using the filter in its fifth position of adjustment.
Figure 6:
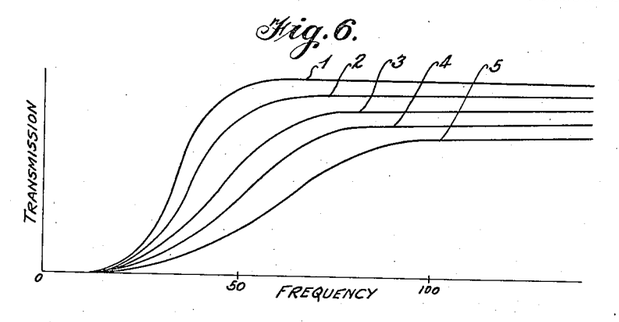
Figure 6 is a group of curves that have been plotted with transmission as ordinates and frequency as abscissae showing the change in frequency cut-off for the different positions of adjustment of the filter.

Referring to the drawings in detail particularly Figures 1 to 5, there are shown portions of seismograms on which have been recorded a plurality of seismic waves that have been reflected from subsurface strata. These illustrations correspond to the filter settings as illustrated in Figure 6, by the curves 1, 2, 3, 4, and 5, respectively. Associating this group of curves in Figure 6 with the respective illustrations in Figures 1, 2, 3, 4, and 5, it is evident that more and more emphasis is placed upon the higher and higher frequencies as we progress from Figures 1 to 5. In Figure 1, where the emphasis is on low frequencies, there are two regions A and B of reflected energy, A being in the region just below 1.0 second and B being in the region just above 1.1 seconds as indicated by arrows. Geophysically it is known that there are four or five substantial geological beds or strata that will reflect waves and it is desired that our seismograph records portray these various beds by the character of the reflected waves as recorded in Figures 1 to 5. Referring to Figure 5 which gives emphasis to the highest frequency range of the reflected energy, we note that there are five distinct phase changes in each of the traces shown in the figure. These phase changes or sudden changes in slopes of the traces are indicated by means of the arrows C, D, E, F, and G shown at the bottom of the figure. The phase change C in slope associated with the reflection from the first bed is at .945 second approximately; the second change in phase D or direction of the traces is shown at .990 second; the third one E is shown at 1.03 seconds; the fourth one F is shown at 1.08 seconds; and the fifth one G is shown at 1.165 seconds.

Figure 2:
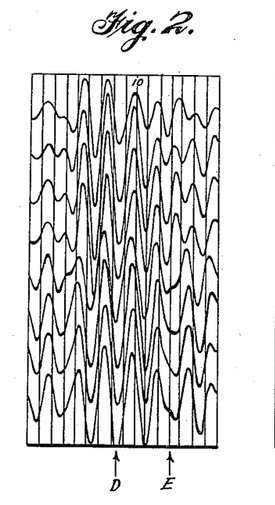
Figure 2 is a second illustration of a portion of a seismogram showing the same reflected waves after having been recorded using the filter in the second position of adjustment emphasizing higher frequencies than those emphasized in Figure 1.
Figure 3:
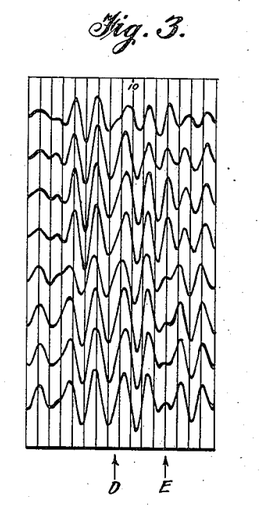
Figure 3 is also an illustration of a portion of a seismogram showing the same reflected waves after having been recorded while using the filter in its third position of adjustment.
Figure 4:
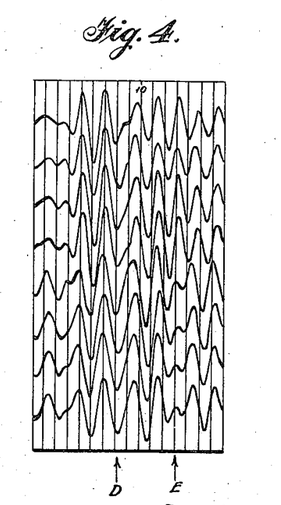
Figure 4 is an illustration of a portion of a seismogram showing the same reflected waves after having been recorded while using the filter in its fourth position of adjustment.

In Figure 1 we would be able to pick the beginning of the first of these reflections in the region of A and approximately the beginning of the fourth reflection in the region of B. The other three reflections which are discernible in Figure 5 are the phase changes D, E, and G are not obvious in Figure 1. If one observes the second reflection beginning at D, as disclosed in Figure 5, after considering it in Figures 4, 3, 2, and 1, it becomes apparent that by the time the condition of Figure 2 is reached this second reflection appears to have disappeared completely.

If one will observe the third reflection as indicated by the arrow E in Figure 5, it will be noted that the evidence of this third reflection has completely disappeared by the time the conditions shown in Figure 1 have been reached. It has substantially disappeared by the time the conditions shown in Figure 2 have been reached.

The beginning of the fourth reflection as illustrated by the arrow F in Figure 5, has substantially been obliterated by the conditions illustrated in Figure 1. If, therefore, the equipment were such that a seismogram, such as illustrated in Figure 1, was recorded, it is obvious that the true geological subsurface conditions would not be disclosed. However, by giving greater and greater emphasis to the higher frequencies, it is possible to separate reflections which are more or less superimposed on one another and pick certain features of these reflections with a great deal of certainty. This result corresponds to the results which we would expect by applying the theoretical foundation already disclosed previously in this specification.

Drillings which have been made subsequent to obtaining the seismogram check substantially the results as disclosed in Figure 5 and would not check the results in Figure 1 if the geophysical interpretation had been made on Figure 1 as its basis.

Using the invention forming the subject matter of this application, one is able to record reflections from closely spaced strata such as are normally recorded as illustrated in Figure 1, in which the reflections overlap one another without any clear line of demarcation between them, and separate them in the manner illustrated in Figure 5.

The earth may in some respect be compared to a band pass electrical filter or network. The highest frequencies produced by the detonation of dynamite will be absorbed quickly by the upper subsurfaces. The lowest frequencies generated by the explosion of the dynamite pass on to the deeper subsurface beds and are reflected back from them. The very lowest frequencies, however, pass on into the earth and are ultimately absorbed therein without being reflected back to the surface of the earth. In this respect, therefore, the earth acts as a band pass electrical filter and the deepest reflections possess a different frequency and energy distribution than do the more shallow reflections. It is obvious, therefore, that a selective attenuator must possess sufficient flexibility to take into account these variations as well as the variations from point to point in order to record accurately the subsurface geological conditions associated with oil-bearing structures.

The system of selective attenuator network described herein consists of a special design of a M-type filter, whose cut-off frequency $f_1$ and whose frequency of infinite attenuation $f_{1\infty}$ can be varied simultaneously according to particular designs based on the needs of seismograph surveying.

Figure 14:
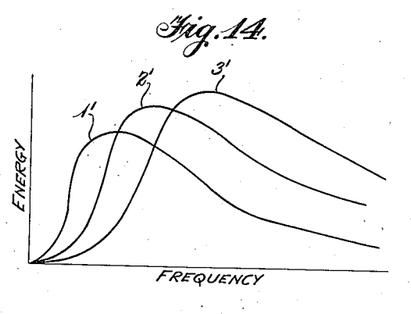
Figure 14 is a group of curves which have been plotted with frequency as abscissae and energy as ordinates showing the manner in which the energy varies with frequency from one depth to another or from one location to another.

This distribution of energy at different frequencies is illustrated by the curves 1', 2' and 3' in Figure 14. Curve 1' for example may represent an energy distribution observed where a large amount of low frequency is present such as in the immediate region of the Gulf of Mexico. Curves 2' and 3' may represent the energy distribution which would be in the upper Mid-Continent regions. Also it is observed that the deeper the geological reflecting beds, the lower is the energy distribution of frequencies so that deep beds might correspond to curve 1' and the more shallow beds might correspond to curves 2' and 3'. In other words, the curves in Figure 14 might represent conditions which would be observed not only as far as locations are concerned but also as far as subsurface depth to the geological beds are concerned.

Figure 15:
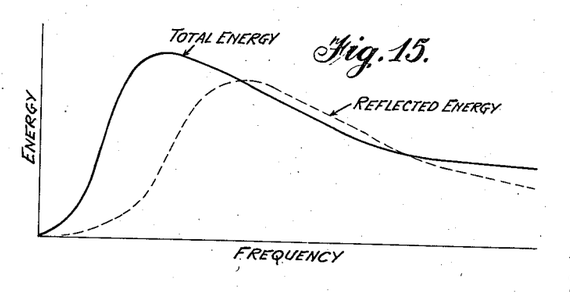
Figure 15 is a group of curves which have also been plotted with frequency as abscissae and energy as ordinates showing the total energy recorded in heavy lines and reflected energy in dotted lines.

In Figure 15 the curve in solid line is illustrative of the total energy being generated while the curve in dotted line represents only the reflected energy that is received. The portion of energy between the solid and dotted curves for the most part represent low frequency energy of the direct traveling and refracted waves which have nothing to do with the reflected waves made use of in seismic method of geophysical survey. Any selective attenuation network, therefore, must exclude these lower frequencies and give emphasis to the band of reflection energies as illustrated by the dotted curve.

In the particular selective attenuator described herewith these ranges might include, for example, 20–80, 20–60, 20–50, et cetera, cycles. The lower frequencies of this group are the frequencies of infinite attenuation and the higher frequencies are the cut-off frequencies. Between these two limits the phase characteristic of the attenuator is constant with frequency. In certain other types of filters the phase error is very substantially greater than with the M-type, and accordingly this particular selective attenuator will record more faithfully the incoming signals than do certain other types of filters. Moreover, this type of selective attenuator permits the recording of the reflected signals with greater emphasis on the high frequency region than on the middle or lower frequency regions. This is accomplished by having several positions for the selective attenuator switch. Movement of the switch from high to low position permits us to emphasize any particular region we desire, as already explained. It is most desirable to set the selective attenuator at a slightly higher frequency range than the incoming reflected signals. When we do this, the higher frequencies of a reflection are emphasized in magnitude relative to the lower frequency. Inasmuch as the higher frequencies come through, in most instances, ahead of the lower frequencies, we are able by this adjustment to record more accurately the beginning of the reflected energy. Also since the final portion of a reflected band of energy is mostly of low frequency components, the final portion of a reflected band is decreased relative to the initial stages. In other words, the beginning of a reflection is emphasized and the end of a reflection is relatively attenuated. This is of great value, particularly where we have a number of close subsurface beds. In this case one reflection comes in partly superimposed on the preceding and following reflections. This selective attenuator, therefore, helps to break down or decompose the reflections, so that individual reflections can be more readily distinguished from the others. This is true the more emphasis we place upon the higher frequency portions of the bands reflected from the different beds.

Another advantage of this particular selective attenuator becomes apparent when we consider that the detectors are "planted" a hundred or so feet apart over a distance of 1,000 feet or 2,000 feet, and the character of the record or trace for each detector may be different from the others. One trace, for example, may have altogether too much "character" or high frequency emphasis. Another may have no "character" whatever and be composed almost entirely of a narrow band of low frequencies. For such cases the selective network is individually adjustable so that additional "character" can be placed in the trace having insufficient "character" and at the same time the selective network adjusted to give less "character" to the trace which was "overcharacterized".

When individual settings of the selective attenuator are different for the different traces, a slight correction is made for the different phase "characteristics" of the attenuators when set differently from trace to trace. This correction is a minute one, consisting of approximately $\frac{1}{1000}$ of a second per step. It is either added or subtracted, depending on what the reference point is. To accomplish this object the selective attenuator is designed in such a way as to make use of one choke or inductance of some predetermined magnitude. We also choose the frequency bands for which the selective attenuator is to be designed. With the bands and the inductance predetermined, we can then compute, from well-known formulas for the M-type filters, the values of the capacities and resistance loads that are necessary to accomplish our desired objects. The theory and methods of computing such networks are well known and given in such books, for example, as Shea's book on "Electrical Networks and Filter Designs" and in various publications such for example, as O. J. Zobel, Bell System Technical Journal, July, 1928, pages 438–534.

While this particular selective attenuator possesses very desirable characteristics with respect to the reflected bands of frequencies, it also possesses most desirable characteristics to exclude the low frequency ground-roll disturbances, as well as underemphasizing the higher microseismic disturbances, such as wind disturbances, vibrating trees, grass, etc. In other words, the maximum attenuation occurs in the region of the maximum low frequency disturbances and the maximum transmission occurs substantially below micro-seismic disturbances of various sorts.

In a design such as indicated in the drawings, where we desire to cover several bands controlled at will, we make use of common condensers and resisters, insofar as possible, for the various bands which we desire to cover. All the condensers and resisters are computed precisely in order that the selective attenuator may function in accordance with the objects of the invention. The manufacturing limits are narrowed to the point where this object is accomplished.

In this manner we have been able to manufacture the selective attenuator system for each amplifier which will function in exact accordance with theory and with the desired object.

Figure 7:
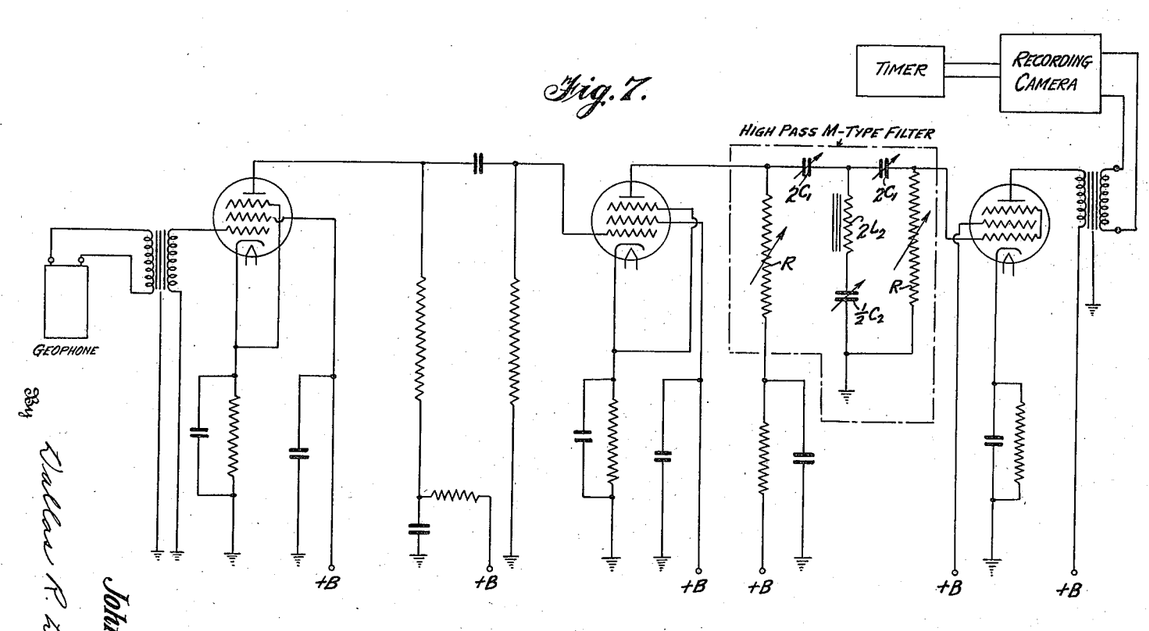
Figure 7 is a circuit diagram of an electric seismograph showing incorporated in the amplifier circuit the selective attenuator network forming the subject matter of this invention.

In Figure 7 there is shown an enlarged detailed view of the M-type, high pass filter disclosed in the circuit diagram in Figure 6. In this view all of the elements with the exception of the inductive choke are shown as variable. The three capacities and the two resisters are so mechanically connected that the movement of a single control will change all of the elements with the exception of the choke a predetermined amount.

Figure 10:
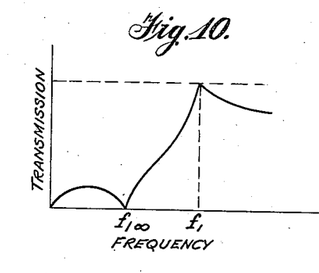
Figure 10 is the transmission characteristic of the series and shunt derived types of filter as shown in Figures 8 and 9.

With reference to Figure 10, such variation would result in a change in the frequency at which the filter begins to cut off. This point is shown as $f_1$ in the diagram. With this arrangement $f_1$ can be varied up and down the range of frequencies as desired. The point $f_1\infty$ remains constant. As will be shown from the following mathematical derivation of the quantities $C_1$, $C_2$, and $R$, to effect a change in the position of $f_1\infty$, it will be necessary to determine a new value of $m$ which is a constant for the particular filter and is derived from the frequency range selected, i. e., $$m = \sqrt{1 - \frac{f_{1\infty}^2}{f_1^2}}$$

where $f_1\infty$ is the frequency at which the filter has infinite cut off and $f_1$ is the frequency at which the filter begins to cut off. By selecting the proper value of $m$ as determined by the frequency range desired, the values of $C_1$, $C_2$, and $R$ can be derived from the following equations in which $L_2$ remains constant:

$$C_1 = \frac{1}{4\pi f_1 mR}$$

$$L_2 = \frac{R}{4\pi f_1 m}$$

$$C_2 = \frac{m}{(1-m^2)\pi f_1 R}$$

The above equations are equations for a series derived filter and represent the required relationships of the values given to the elements in the filter.

Figure 9:
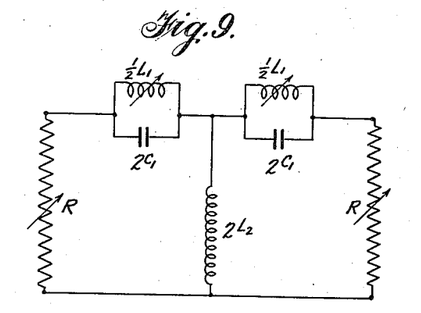
Figure 9 is a modification of the filter shown in Figure 8, differing from the one shown in Figure 8 in that it is the shunt derived type.

In Figure 9 there is shown a shunt derived M-type, high pass filter which for practical purposes can be used in the amplifier to serve the same purpose as the series derived type merely by substitution. The values assigned to the elements present in this form of filter are derived from the following equations that represent the required relationship of the values. In all these $L_2$ remains constant at some chosen value.

$$L_1 = \frac{mR}{(1-m^2)\pi f_1}$$

$$C_1 = \frac{1}{4\pi f_1 mR}$$

$$L_2 = \frac{R}{4\pi f_1 m}$$

The value of $m$ for this group of equations will be the same as that used in connection with that of the series derived equation and will depend upon the frequency range selected.

Figure 8:
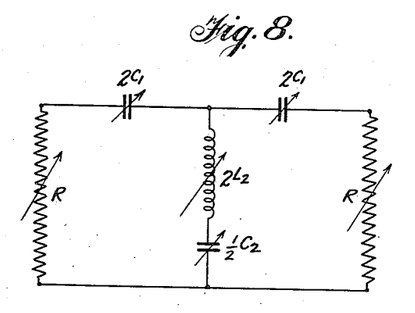
Figure 8 is an enlarged detailed view of the selective attenuator shown in Figure 7.

A filter of this character will have the same transmission characteristics as that discussed in connection with Figure 8 and shown in Figure 10.

Figure 11:
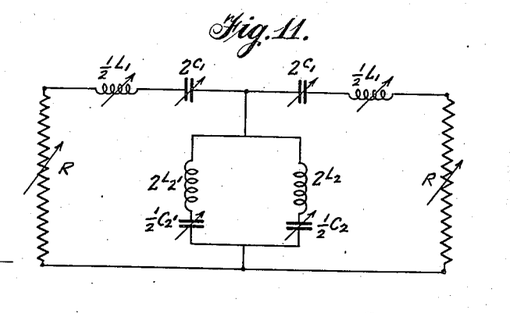
Figure 11 is still another modification of the filter network of the series derived type.

In Figure 11 there is shown a filter of the band pass M-type adaptable for producing the results described in this application. This filter is of the series derived type and is composed of one fixed inductance and a plurality of variable inductances, resistances and capacitances. Such an arrangement will have a transmission characteristic such as illustrated in Figure 11 where $f_1\infty$ illustrates the low frequency of infinite cut-off; $f_1$ the low cut-off frequency; $f_2$ the upper cut-off frequency, and $f_2\infty$ the upper frequency of infinite cut-off. The value of the elements in this diagram are derived by the following equations which show their required relationship in which $L_2$ remains constant at some chosen value.

$$L_1 = \frac{mR}{\pi(f_2-f_1)}$$

$$C_1 = \frac{f_2-f_1}{4\pi f_1 f_2 mR}$$

$$L_2 = \frac{aR}{\pi(f_2-f_1)}$$

$$C_2 = \frac{f_2-f_1}{4\pi f_1 f_2 bR}$$

$$L_2' = \frac{bR}{\pi(f_2-f_1)}$$

$$C_2' = \frac{f_2-f_1}{4\pi f_1 f_2 aR}$$

The values of the constants $m$, $h$, $a$, and $b$ are derived in the following manner: where $$m = \frac{h}{\left(1-\frac{f_1 f_2}{f_{2\infty}^2}\right)}$$

$$h = \sqrt{\left(1-\frac{f_1^2}{f_{2\infty}^2}\right)\left(1-\frac{f_2^2}{f_{2\infty}^2}\right)}$$

$$a = \frac{(1-m^2)f_1 f_2}{4h f_{1\infty}^2}\left(1-\frac{f_{1\infty}^2}{f_{2\infty}^2}\right)$$

$$b = \frac{(1-m^2)}{4h}\left(1-\frac{f_{1\infty}^2}{f_{2\infty}^2}\right)$$

$$f_{1\infty} = \frac{f_1 f_2}{f_{2\infty}}$$

Figure 13:
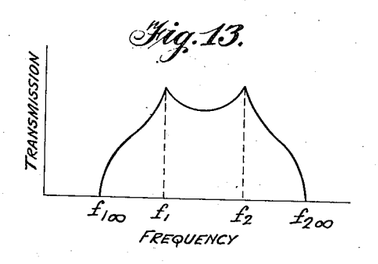
Figure 13 is the transmission characteristic of the two types of filter shown in Figures 11 and 12.

The filters of this character may properly be designated as a band pass M-type filter in that it passes frequencies between the points $f_1$ and $f_2$ shown in the transmission characteristic in Figure 13. In design it is possible to vary the points $f_1\infty$ relative to $f_1$ and at the same time and in the same manner $f_2$ relative to $f_2\infty$, or the band $f_1$ to $f_2$ up or down the frequency range.

Figure 12:
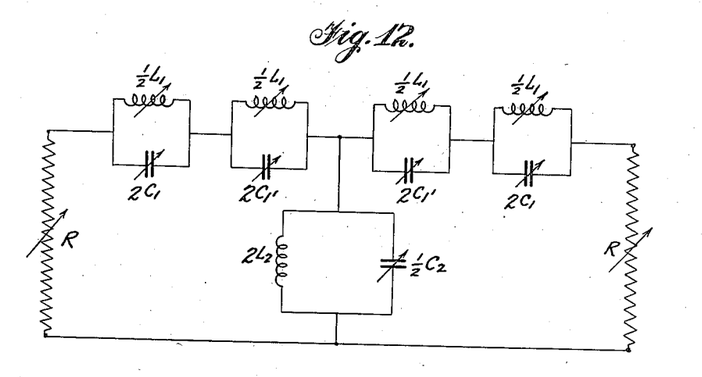
Figure 12 is still another modification of the filter network of the shunt derived type.

In Figure 12 there is shown another modification of this filter which is illustrated as an M-type shunt derived. This is also a band pass filter and has a characteristic such as that shown in Figure 13 and described in connection with Figure 11. The values assigned to the elements in the filter are derived by the following equations which show their required relationship in which $L_2$ is maintained constant at the chosen value.

$$L_1 = \frac{(f_2-f_1)R}{4\pi f_1 f_2 b}$$

$$C_1 = \frac{a}{\pi(f_2-f_1)R}$$

$$L_1' = \frac{(f_2-f_1)R}{4\pi f_1 f_2 a}$$

$$C_1' = \frac{b}{\pi(f_2-f_1)R}$$

$$L_2 = \frac{(f_2-f_1)R}{4\pi f_1 f_2 m}$$

$$C_2 = \frac{m}{\pi(f_2-f_1)R}$$

The values of the constants $m$, $h$, $a$ and $b$ are the same as those ascribed to them above. It is possible to vary the points of frequency cut-off in a filter of this character in the same manner as that shown in Figure 10.

It is well known that the character of the seismograph record often changes, from shot hole to shot hole. As already explained, when the dynamite explodes, one of the results is a band of frequencies, of compressional waves, and these frequencies are reflected back from the subsurface beds and permit the recording of the wave on photographic paper. The frequencies of which these bands are composed are not always of the same intensities at the various shot holes, and the distribution of energy accordingly occurs over bands which are shifted either up or down from some average band of the region. Occasionally, it is observed that some particular shot point may possess a great abundance of low frequencies or high frequencies, as the case may be. If we have a greater abundance of low frequencies at some particular shot point, the reflected band will return to the geophones at a slightly later time than the return energy arrives at the phones for higher frequencies. The possibility of "jumping a leg" comes up. In order to correlate such a shot point with the rest of the region, it is necessary to make a velocity determination from T∆T observations at that particular point. It will be found that the velocity is slightly lower than observed at an adjacent shot point, but the product of the new velocity and the observed time will give the proper depth to the subsurface beds at the point in question.

In ordinary seismograph surveying it would be impossible to correlate with precision on time because of the observations as stated above. However, with the selective attenuator network, it is, to a large extent, possible to adjust the selective attenuator, so that the frequency characteristic of the record is more or less identical with that of the record attained from an adjacent higher frequency shot point. In the case under discussion the record at the higher frequency shot point would be obtained with the selective attenuator in a medium position, whereas the selective attenuator for the lower frequency shot hole would be set at a position giving emphasis to the higher frequencies of the band generated at this lower frequency shot point. In this case the appearance of the two records at adjacent holes would be substantially alike and would greatly reduce the tendency to "jump a leg," permit proper correlation and interpretation. If we had no control, such as the selective attenuator, this correlation in many cases would be at least subject to error, if not impossible to obtain.

I claim:

In a method of seismic prospecting that comprises generating seismic waves, detecting said seismic waves at a distant point and reducing them to corresponding electrical waves, amplifying said waves, and recording the resultant waves, the improvement that comprises electrically emphasizing selected high frequencies and at the same time highly attenuating other frequencies, adjusting the phase characteristics of the selected high frequencies to correct for phase distortion thereof, and recording the emphasized selected frequencies in a manner such that waves corresponding to seismic waves that have been reflected from closely adjacent substrata can be distinguished.

JOHN P. MINTON.

---

CERTIFICATE OF CORRECTION.

Patent No. 2,209,100.     July 23, 1940.

JOHN P. MINTON.

It is hereby certified that error appears in the printed specification of the above numbered patent requiring correction as follows: Page 1, first column, line 37-38, for "distance" read --instant--; page 3, second column, line 6, for the word "are" first occurrence, read --by--; and that the said Letters Patent should be read with this correction therein that the same may conform to the record of the case in the Patent Office.

Signed and sealed this 25th day of March, A. D. 1941.

(Seal)     Henry Van Arsdale,
Acting Commissioner of Patents.

CERTIFICATE OF CORRECTION.

Patent No. 2,209,100.          July 23, 1940.

JOHN P. MINTON.

It is hereby certified that error appears in the printed specification of the above numbered patent requiring correction as follows: Page 1, first column, line 37-38, for "distance" read --instant--; page 3, second column, line 6, for the word "are" first occurrence, read --by--; and that the said Letters Patent should be read with this correction therein that the same may conform to the record of the case in the Patent Office.

Signed and sealed this 25th day of March, A. D. 1941.

(Seal)

Henry Van Arsdale,
Acting Commissioner of Patents.